Patented June 9, 1942

2,285,478

UNITED STATES PATENT OFFICE 2,285,478

METHOD OF MAKING EDIBLE PRODUCTS AND MATERIAL FOR USE THEREIN

John R. White, Belmont, and Joseph Avery Dunn, Newtonville, Mass., assignors to Lever Brothers Company, a corporation of Maine No Drawing. Application February 3, 1938, Serial No. 188,442

4 Claims. (Cl. 99—123)

This invention relates to the art of making edible products in which shortening is employed as an ingredient, particularly bakery products, and to material for use therein.

An object of this invention is to produce such edible products having improved appearance, eating qualities, and keeping properties.

In the production of baked products, for example cakes, the moistness, sweetness, tenderness, soft and light texture, uniform fine grain, as well as keeping properties of the product are highly prized. The products made in accordance with our invention, as compared with ordinary bakery products otherwise similar in ingredients, are finer in texture, more tender, shrink to a less extent, and possess superior keeping properties. It is well known that as the richness of a cake is increased when it is made in the conventional manner, and in particular as the amounts of sugar and moisture are increased, a point is reached where the cake will shrink excessively or collapse during or after baking; the resulting product is soggy, unappetizing and entirely unacceptable from an edible or marketable standpoint. Because of this tendency for a rich cake to "fall," if it is made in the usual manner with ordinary shortening, there is a definite limit to the richness which has been believed could be obtained when employing conventional procedures and materials. The ultimate object of a baker is to increase the richness of a cake, particularly the sugar and moisture content, to a point where the product has maximum eating qualities and maximum keeping properties. By means of this invention a baker is able to produce cakes, without appreciable shrinkage, which have a greater richness than that obtainable heretofore with ordinary shortening.

It is therefore an object of the invention to provide a process of making bakery goods which will have a maximum richness and a minimum shrinkage, as well as increased moistness, sweetness, tenderness, better keeping properties and an improved appearance and texture.

Another object of the invention is to increase the utility of various qualities of cake flour in very rich cakes, particularly the relatively poor grades of flour. In practicing the invention, the difference in various commercial grades of flour becomes of less significance. It is possible to make very rich cakes, with a minimum of shrinkage and having a light, tender texture and improved keeping properties, when employing flours heretofore considered unsuitable for the manufacture of such cakes.

Another advantage of the invention is reflected in a desirable change in the physical properties of cake batters made in accordance with the invention. They are of exceptional smoothness and have a free flowing consistency. The employment of the invention also minimizes the curdling that normally accompanies high moisture cake mixtures. The increased workability of the batters permits them to spread evenly in a cake pan. This insures a symmetrical contour of the cake layers with a consequent improvement in the appearance of the baked product. The cake products have a bold contour with firm high shoulders. This minimizes breakage during icing, packaging and shipping.

The invention may also be employed in manufacturing yeast raised bakery goods with an improvement in texture, eating qualities and water absorption. The latter property is of particular importance in such bakery products because they tend to dry out and become inedible and unsaleable at a relatively rapid rate. In accordance with the invention, which permits the inclusion of a great amount of moisture in the product, the length of time over which the product remains in edible or saleable condition is greatly increased.

In the production of icings containing fats or oils or both, and particularly that class of icings or frostings referred to as "cream icings," the invention manifests itself in an improved texture and smoothness of the icing with a consequent improvement in the eating qualities. The proportion of liquids utilizable in icings made in accordance with the invention is also increased. The icing remains smooth and soft for a longer period of time and the crystallization of the sugar is delayed, resulting in a non-gritty icing.

The invention may also be practiced in manufacting other confectionery products in which fats or oils or both are included, such as fondant, and there is a consequent improvement in texture, appearance, eating qualities, moisture holding capacity and keeping properties.

It is therefore also an object of the invention to produce superior icings and confectionery products.

The invention may be practiced in connection with prepared bakery and confectionery mixtures either in a dry, plastic or liquid form and the improvements in the products made from such prepared mixtures are essentially the same as when the product is prepared from its ingredients in one continuous operation.

In practicing the invention, a plastic shortening composition, for example, a hydrogenated vegetable oil, is first mixed with egg material to form a smooth, plastic, homogeneous product. A particularly desirable plastic shortening may be made from blended hydrogenated edible oils "aerated" by the inclusion of air or an inert gas in an emulsified or occluded form. Other plastic fats may be used, for example, naturally occurring plastic fats and also fats of the so-called compound type in which an edible oil is blended with a sufficient quantity of a hard fat to produce a plastic mixture which is preferably aerated.

In the preferred embodiment of the invention, yolks of eggs are mixed with the fat, although whole eggs or whites of eggs may be used to somewhat less advantage. The expression "egg material" is intended to refer to egg yolks, egg whites or any mixture thereof.

The amount of the egg material incorporated with plastic fat may vary. Very small amounts reflect an improvement, but in general about 3 to 5%, based on the weight of the plastic fat, is advisable to give desirable results. The upper limit of the egg material is determined only by the consideration of economy. No deleterious effect is obtained when a much higher amount of egg material is employed, but if the amount is greatly increased there is not a proportional increase in the advantages. Furthermore, due to the relatively greater cost of egg material, and the fact that a large amount imparts a color which would not be desirable in certain products, it is preferable not to employ amounts greater than 10 or 15%.

The plastic fat and the egg material may be mixed by hand or by any machine which will produce a uniform intimate mixture, for example, an ordinary creaming mixer of the type commonly used in the commercial production of cake batters.

In accordance with the invention, the egg material and the plastic fat may be mixed immediately prior to a particular bakery operation or it may be produced considerably in advance of a particular bakery operation and then stored and used as needed.

In addition to ordinary fresh egg material, frozen egg material or egg material otherwise preserved or dried may be used.

In practicing the invention the egg and shortening mixture is added to the other ingredients that are used in making the particular product. In accordance with a specific embodiment of the invention given merely as illustrative, a layer cake having a large sugar content may be made as follows: 1 lb. of egg yolks and 15 lbs. of a plastic hydrogenated aerated fat are creamed until the mixture is homogeneous and all egg spots have been smoothed out. This will require 1½ to 3 minutes at medium speed. This may be stored at room temperature and used as desired. In making the cake, 2 lbs. 8 oz. of this egg and shortening mixture, 5 lbs. flour, 7 lbs. sugar, 2¾ oz. of salt, and 4¾ oz. baking powder are mixed dry for two minutes at low speed. A mixture comprising 3 lbs., 12 oz. of egg whites and 4 lbs., 12 oz. of liquid milk is prepared, and 1 quart of the egg-milk mixture is added to the mixed dry ingredients and creamed well at medium speed for 6 minutes. Another quart of the egg-milk mixture is added and creamed for 3 minutes at medium speed. The remainder of the egg-milk mixture is added and creamed for 3 minutes at low speed. The mixture is baked at 360–375° F. in 8-inch round pans containing 14 oz. of the mixture.

In the above recipe the proportion of sugar is about 140% of the weight of the flour. Cakes having smaller proportions of sugar, for example, 120% or 100% may also be made according to the formulas well understood in the art and such cakes will have similar desirable properties.

The invention may be practiced in the production of bakery products in which egg material is normally a constituent and in such a process, the egg material which is initially mixed with the shortening may be subtracted from the amount of egg material normally used in such a product. The egg and shortening mixture may also be used in the production of bakery products in which egg material is not normally employed and in this manner egg material may satisfactorily be introduced into the formula.

The homogeneous mixture of the egg material with the plastic fat affects the physical properties and the workability of the shortening in a bakery or confectionery mixture, and the manner in which the shortening combines with the other ingredients in a bakery product is often distinctly changed. As a result, it is often possible to accomplish a given mixing procedure with less time and with less energy, and at the same time to obtain improved results.

As illustrative of the invention as applicable to bakery products made with low grade flours, as well as to special cake flours, cakes were made employing a special cake flour and otherwise identical as to ingredients except that an ordinary hydrogenated shortening and the egg and shortening mixture made in accordance with the invention were used, respectively. The volumes of 14 oz. layers of the cakes, respectively, were 780 and 1043 cc.

When the same two procedures were employed in an otherwise identical formula, except that a low cost all-purpose flour was used, the volumes were 775 cc. and 994 cc., respectively. It is therefore apparent that improved cakes can be obtained in accordance with the invention using lower grades of flour.

As illustrative of an icing made in accordance with the invention, 5 lbs. of the egg and shortening mixture, 1 oz. of salt and 1¼ lbs. of dry skimmed milk powder are placed in a mixer and 2 oz. of vanilla extract and 3 lbs. of cold water are added as the mixture is being whipped. After the water is well incorporated, 20 lbs. of confectioners' sugar is added and the icing is then whipped until light. This icing is less grainy and remains softer and more moist after standing for one week on an unwrapped cake than is the case where an ordinary shortening is employed.

As illustrative of the application of the invention to confections, an orange fondant cream center may be made in accordance with the following procedure: 5 lbs. granulated sugar, 1 lb. corn syrup, 8 oz. of water and 2 lbs. of evaporated milk are boiled at 236° F. and poured on a slab and cooled to 98° F. The batch is divided into two equal portions and 2 oz. of the egg and shortening mixture and orange juice to taste are worked into one-half of the batch, and 2 oz. of ordinary hydrogenated shortening and orange juice to taste are worked into the other half of the batch to serve as a control. After standing for one week, the fondant made in accordance with the invention was by far softer and less grainy than that made with an ordinary shortening.

Other bakery and confectionery products in which the egg and shortening mixture is an ingredient, and particularly those containing large proportions of sugar and moisture, are obvious to those skilled in the art and are within the scope of our invention.

It has been proposed heretofore to make butter substitutes by mixing oils with egg material with or without milk and with or without heating. Tests have been made which indicate that such butter substitutes are not effective for producing the desired results that are obtained by this invention. The heating often employed in such prior art operations alters the egg material in such a manner that the improved results cannot be obtained. In addition, the shortening of this invention is to be distinguished from an oil and milk emulsion to which the egg is added, and which is not effective in accomplishing the desired results.

It has also been proposed heretofore to employ lecithin admixed with oil, and as an element of bakery formula. It is appreciated that lecithin is one of the constituents of egg yolk but tests show that lecithin is not capable of producing the desired results described heretofore.

The invention includes variations other than those specifically described and the same are intended to be included in the invention as defined in the following claims.

We claim:

1. As an ingredient to be used in the production of bakery and confectionery products having maximum edible and keeping properties and containing sugar, fats and a large proportion of moisture, a dry homogeneous and plastic material comprising a plastic edible fat intimately mixed while in a plastic unmelted state with 3 to 15% egg yolk, whereby the egg yolk is present and remains in said plastic material in a substantially unchanged state.

2. In a process for producing a cake having maximum edible and keeping properties and comprising liquids, flour, more sugar than flour, a dry plastic fat, and any other ingredients ordinarily contained in a cake, in which process said above-named ingredients are mixed, the step which comprises intimately mixing said fat while in its plastic state with 3 to 15% of egg yolk based on the weight of said fat, prior to the admixture of the fat with any of said other ingredients of the cake.

3. In a process for producing a cake having maximum edible and keeping properties comprising flour, more sugar than flour, a relatively large proportion of liquid constituents, a dry plastic aerated fat made from hydrogenated vegetable oil, and any other ingredients ordinarily contained in a cake, in which process said above-named ingredients are mixed, the step which comprises intimately mixing said fat while in its plastic aerated state with 3 to 15% of egg yolk based on the weight of said fat, prior to the admixture of the fat with any of said other ingredients of the cake.

4. As an ingredient to be used in the production of bakery and confectionery products having maximum edible and keeping properties and containing large proportions of moisture and sugar, a dry homogeneous and plastic shortening comprising a dry, plastic, edible, aerated fat made from hydrogenated vegetable oil intimately admixed with 3 to 15% egg yolk, said fat in said plastic shortening retaining its original aeration and said egg yolk being present and remaining in said plastic shortening in a substantially unchanged state.

JOHN R. WHITE.
JOSEPH AVERY DUNN.